June 30, 1936. A. L. SMYLY 2,045,807
OXIDATION OF IRON
Filed Nov. 2, 1933
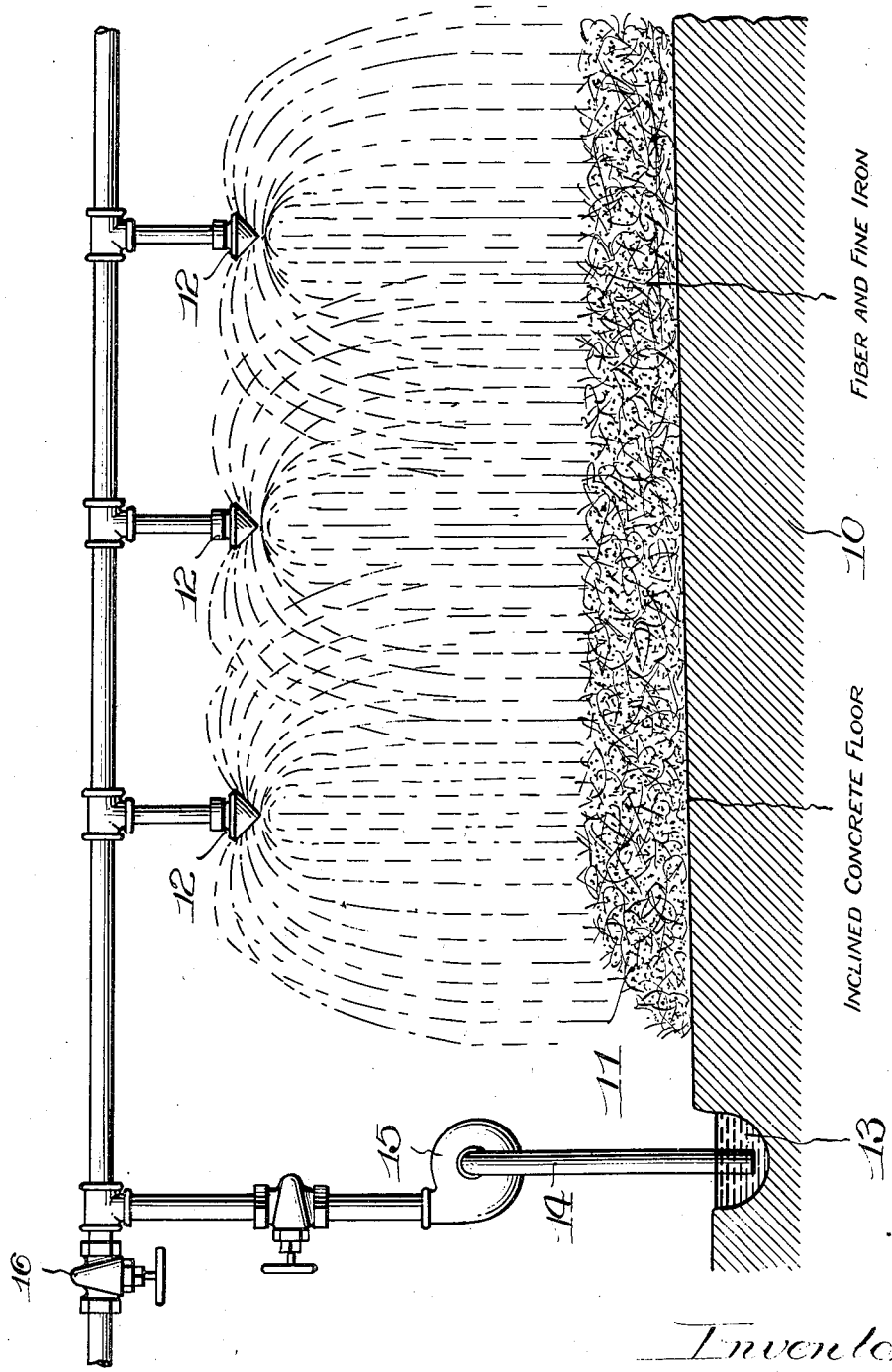

Patented June 30, 1936

2,045,807

UNITED STATES PATENT OFFICE 2,045,807

OXIDATION OF IRON

Arthur L. Smyly, Chicago, Ill.

Application November 2, 1933, Serial No. 696,317

11 Claims. (Cl. 252—2.5)

The present invention relates to the manufacture of desulphurizing iron oxide "sponge" for sulphur-containing gases. It is a practice to use an active type of iron oxide to remove sulphur from gas-containing sulphurous impurities. This is ordinarily done by providing a porous bed containing the oxide. The bed is usually of some inert material or structure which carries the oxide in a dispersed form to make its surface available to the gas passing through the bed. One method in common use is the provision of coarse fiber or chips, on or in which there is active iron oxide. One way of compounding such material is to form the iron oxide from a mixture of iron and fiber by a controlled rusting process.

The present invention relates to such a rusting process, and aims to form from iron an active and efficient iron oxide, and also to assure an efficient association of it with the carrier fiber.

The primary object of the invention is control of the conditions of corrosion to form a hydrated ferric oxide which is highly efficient when moist in removing sulphurous impurities from hydrocarbon gases, and which when so spent, is capable of regeneration to active form by giving up its sulphur through oxidation by use of air.

A particular object of the invention is the avoidance of conditions which form an inactive type of oxide.

Another object of the invention is the use of initially of highly dispersed ground iron as the raw iron base, and the maintenance of it in dispersed condition during the process of corrosion.

A further object of the invention is the step of anchoring the metallic iron grains or particles to a carrier such as fiber, on which the corrosion is allowed to take place.

Another object of the invention is the use iron-containing substance to anchor the iron grains to the carrier.

Still another object is to effect oxidation in the presence of water by use of oxygen carried in the water.

Another object of the invention is the avoidance of submerging all or any substantial part of the corroding base in water.

Still another object of the invention are the steps of washing aerated water over the corroding mass, draining away and recirculating the spent aerated water.

Various other and ancillary objects and advantages of the invention will become apparent to those skilled in the art from the description and explanation of one method of carrying out the invention as it is hereinafter given in detail in connection with the accompanying drawing.

In the drawing the figure illustrates in cross-section a sloping bed or floor on which solid material carrying the corroding iron is subjected to the passage therethrough of aerated water without submergence of the material in water.

In carrying out the invention as I prefer to operate, I use iron as raw material and control the corrosion thereof to assure a formation of a highly absorbent and regenerative form of oxide. In referring to "active" iron oxide in this invention, I intend to convey by the description "active", not only the idea of activity to efficiently take sulphur from the gas, forming iron sulphide or possibly iron-sulphur complexes, but also the idea of a regenerative capacity. By the latter, I refer to the reversibility of the process, whereby, when air is passed over the spent oxide (loaded with combined sulphur) the sulphur is set free as such and an efficient and "active" oxide form is again produced which is subject to reuse, and further regeneration for many such repeated operations.

The type of iron desired for these purposes is a hydrated ferric oxide of the $Fe_2O_3$ type. The ferro-ferric oxide is not efficient or "active" within the intended meaning of this term as used herein. Hence it is an object to control the corrosion to assure a high degree of conversion to the active form.

Heretofore, it has been a practice to use iron borings or turnings as the raw iron base for the corrosion process, but such forms have the disadvantage that complete conversion to active material does not follow. The relatively large size of iron particle, especially the curved and creviced formations which characterize borings and turnings, contribute to poor conversion. There is an undesirable formation of thick bodies of oxide. Considerable heat is generated and localized, and this heat, and the encrusting protection of oxide, prevent access of the controlling agents, and operation of controlling conditions, with the result that the desired hydrated form is not efficiently procured. Uncorroded iron frequently remains because of a protection afforded to the metal by oxide of the type not desired. The iron oxide so formed on turnings or borings is caked and is not well distributed or distributable.

The present invention contemplates the use of finely divided particles or grains of iron, which are themselves well distributed on fiber before the corrosion process is initiated. Promotors of corrosion such as sodium chloride or other salts may or may not be used, but use of them is preferred as will appear by specific reference to a preferred agent hereinafter given.

As raw iron, I use cast iron borings or machine shop turnings from iron and steel, which have been freed from oil and grease and ground fine, preferably passing a 50 mesh to a 100 mesh screen,—and the finer, the better. As a carrier any suitable material, preferably fibrous material, may be used, such as fiber of cellulosic character, like wood shavings, corn cobs, stalks, straw, coarse fibers, coarse sawdust and the like, or various mixtures of different forms or of different kinds of fiber or other carrier. Asbestos fiber, mineral wool, coke particles, lava, and like substances are examples of other carriers.

In the preferred operation the finely divided iron is mixed with the carrier, for example when it is wood shavings, in equal parts by weight. If desired fine sawdust may be added in varying quantity such as an amount equal to 10% of the weight of shavings. This is desirable where the shavings are relatively coarse or thick, merely to provide a finer fiber for the larger spaces which will be present in the shavings.

The proportion of iron to carrier, is not critical, and may be varied according to the concentration of iron oxide desired in the product, and according to the character of carrier. The desirability is more or less predetermined by the conditions of use, such as sulphur content, and time of contact with the mass. However, I have found that the efficiency of the oxide formed is increased as the iron content is reduced. The ideal appears to be the presence of only sufficient iron, so that upon completion of proper oxidation, the carrier is completely stained or coated with a very thin active oxide in part impregnating the carrier.

Generally the corrosion is conducted to effect oxidation of the iron through the agency of oxygen carried in solution, either in water, or in a water solution containing promoting agents, such as an iron chloride or sulphate. An aquatic corrosion is desirably effected and an atmospheric corrosion is desirably avoided. To this end a promoter, such as ferrous sulphate is used to increase the effective oxygen content or oxidizing capacity of the solution, and to act as a sort of catalytic agent favoring the rapid aquatic corrosion. The process is distinguished from a liquid submersion corrosion in order to minimize the separation of the iron and the oxide from the carrier and from each other, and to assure its more intimate physical union with the carrier, and its wide distribution thereon.

The process is initiated by mixing the ground iron and the carrier, as in a cement mixer, using enough water to soak the carrier and to assure adherence of the iron to the fiber. The adherence is augmented by the use of chemicals which form a suitable precipitate, adherent to the fiber, as an initial vehicle to hold the iron grains. Numerous reagents may be used to form an inert precipitate, but I prefer to form an iron containing precipitate, so that it becomes active oxide in the ultimate product. For this purpose I use calcium oxide and ferrous sulphate. These are preferably added in the dry form and are mixed with the wet carrier and iron. For example to 5 to 10 parts of iron present I may use one part of dry CaO and two parts of crystalline ferrous sulphate. These react in the presence of water forming insoluble iron hydroxide, and also calcium sulphate, both of which deposit on the carrier and hold the iron grains in well distributed arrangement. Excess ferrous sulphate may remain as a promoter, and more is added from time to time, as will be mentioned later. A solution of ferrous sulphate may be used initially in place of water and crystals.

The material 11 so mixed is spread onto an inclined floor, as of concrete 10, to a depth of 6 inches to 10 inches, where it is allowed to stand for approximately one hour. Heat develops from the oxidation and water is absorbed in the resulting hydrated iron oxide. If these conditions were continued the heating, and the depletion of water, and of oxygen in water, would lead to atmospheric corrosion to produce an undesired form of oxide. To minimize this it is important that the remaining treatment be controlled.

After the first hour it becomes necessary to supply aerated water. This is done by spraying water onto the mass through overhead spray nozzles 12 suitably disposed above the bed to effect a high oxygen content in the water reaching the bed. This spraying is continued for about two weeks, and at the same time the bed is turned over, by plowing or other means, several times a day, in order to insure average uniform action throughout the bed. The water draining through the bed gives up its oxygen to the iron and aquatic, rather than atmospheric corrosion is made to dominate the process.

It is advisable to add ferrous sulphate from time to time, and the criterion is the maintenance of a slightly acid condition. These conditions also retard the formation of black magnetic oxide. Acidity favors the aquatic corrosion by first forming ferro-ferric hydrate, a blue-green precipitate. This blue-green oxide tends to wash down in the bed and out of the region of the highest oxygen concentration. Therefore, the turning over of the bed constantly brings it to a higher level where it becomes oxidized to the yellow brown hydrated ferric oxide.

In order to conserve water and any promoting chemicals used, the water is allowed to drain from the inclined floor 10 into a collector, indicated diagrammatically at 13, from which it may flow, as in pipe 14 to a pump 15 for recirculation to the nozzles 12. The supply may be alternatively procured from another source 16, and both may be used together if desired.

The two weeks' period is given as an approximate time for corrosion, and many conditions may permit shortening it, or may require prolonging it. During the period practically all of the iron should have disappeared as iron, and from it an oxide form is present. A minor part of it may still be in blue green ferro-ferric form, so the process is continued to effect complete conversion to the final yellow brown hydrated ferric form. The process is therefore extended for about one week with intermittent spraying, for example, of about two hours, followed with idle water sprays for about four hours. During this period water is used, and it is preferably not supplied with promoting agents. Thus some excess salt or acidity is removed by the washing effect. However, to insure complete removal, about 10% based on dry weight of the mass) of calcium hydrate, Ca(OH)$_2$ is dusted over the bed, and the bed thoroughly turned over to mix the lime into it. This assures non-acidity, and initial alkalinity in the completed product. The product is ready for use.

The control of the process is dictated by recognition of the effect of prevailing conditions. At the beginning of corrosion a large amount of iron is present, causing the formation initially of a ferro-product. The final ferric form is arrived at through a ferro-ferric form. The ferro-ferric oxide formation may proceed either to the so-called stable black magnetic type, or to the unstable bluish green type. The black magnetic form occurs when there is a deficiency of oxygen, when iron is present, and may occur when yellow brown ferric oxide is present, and when the blue ferro-ferric oxide is present. Deficiency in oxygen is the important cause of its formation. For this reason the process herein described uses aerated water, a good supply of it, an inclined floor to avoid stagnation, and chemical promotors to increase the oxygen capacity of the water. The black form is not active, does not revivify and is not convertible readily to the yellow brown ferric form. By assuring a supply of oxygen the blue ferro-ferric form is secured. This is easily recognized and is subject to test of its character. By simply adding a little hydrogen peroxide to it, it goes over immediately to the yellow brown ferric form. It is unstable and will so oxidize either by oxygen from the air or from water. This oxidation generates heat, and therefore in the process described care is taken that such oxidation is completed before the mass is considered as ready for use. The one week extension of the process may be omitted if suitable other precautions are taken. I refer particularly to this generation of heat. Should the mass containing active ferric oxide hydrate, and oxidizable blue green ferro-ferric oxide be compacted or stored in bulk, oxidation may proceed and generate sufficient heat to dehydrate the desired active form to such an extent that it is not efficiently active or useful. It will however stand heat up to 212° F. without harm.

By reason of the process described, the first oxidation taking place in the presence of iron is controlled largely to form the blue green ferro-ferric type of oxide. This is then converted by additional oxidation to the yellow brown ferric type of the hydrate form. It is well known that ferrous hydroxide is soluble in water, but is readily oxidizable to insoluble ferric hydroxide by dissolved oxygen. Hence the product which is obtained by this process is practically a "precipitated" form. It is effected in the present of water without submersion of the mass in water. These conditions favor its association in adherent relation to the carrier, in a well distributed condition highly suitable for its intended use. This process operates against washing oxide away from the carrier, and in the event some is washed away or is carried away as soluble ferrous hydroxide, it may be brought back in the recirculation of the effluent solution. Whatever is not brought back may be recovered from the collector 13.

In practicing this invention it is important to have the process take place in the presence of water containing dissolved oxygen, and to avoid stagnation. Hence it is desirable to prevent pools of water, and this is done by draining away the water employed. Numerous mechanical arrangements for this are possible. Because of the practice herein described of plowing over the material in the bed, a solid floor is used, and this is made inclined to assure removal of water, and to avoid the stagnation. It has been found that where the process occurs in stagnant water, depleted of oxygen, the undesirable black or dark magnetic oxide is obtained.

Various modifications of the procedure are of course possible, but these should be made with the object of attaining the hydrated ferric oxide, and the adherence to the fiber, with high specific surface of the active material, and high porosity for the impregnated and coated carrier. It is therefore to be understood that the invention is not limited to the details of the operation as herein described, the procedure and proportions being illustrative, rather than examples of critical conditions. Such variations are contemplated as falling within the scope of the invention as expressed in the appended claims.

I claim:

1. The method of making active ferric oxide hydrate for the desulphurization of gases which comprises grinding iron to grains of at least 50 mesh, mixing said grains with a carrier in a bed of shallow depth, sprinkling aerated water over said bed sufficiently rapidly to prevent depletion of oxygen in the water draining from the bed, and draining away the said water from the bed, said process being continued while iron as such remains in the bed, whereby an active type of oxide is formed and the formation of an inactive type is avoided.

2. The method of making active ferric oxide hydrate for the desulphurization of gases which comprises subjecting iron in the form of grains of at least 50 mesh to the action of aerated water with the avoidance of subjecting the iron to water lacking in carried oxygen until all the iron as such has been converted into an oxide, whereby the corrosion is directed to the formation of an oxidizable ferro-ferric oxide and the formation of stable ferro-ferric form is avoided.

3. In the method of corroding iron to oxide in the presence of an ultimate carrier for said oxide, the steps of mixing iron grains and said carrier, and adding materials which form an insoluble precipitate capable of adherence to the iron and to the carrier, whereby said precipitate anchors the grains onto said carrier.

4. In the method of corroding iron to iron oxide in the presence of an ultimate carrier for said oxide, the steps of mixing iron grains and said carrier, and adding materials which react to precipitate gelatinous ferric hydrate, whereby the said precipitate anchors the iron grains to the carrier.

5. In the method of corroding iron to iron oxide in the presence of an ultimate carrier for said oxide, the steps of mixing iron grains and said carrier, and adding water, calcium oxide and iron sulphate, whereby the resulting precipitate of iron hydroxide and calcium sulphate anchors the iron grains to the carrier.

6. The method of making active ferric oxide hydrate for the desulphurization of gases which comprises distributing fine iron grains passing a 50-mesh screen in a carrier having high porosity in bulk formation, trickling aerated water through the mass without exhausting the oxygen content of the water until the iron as such has been oxidized, and thereafter permitting residual blue green ferro-ferric oxide hydrate to oxidize in the mass to yellow brown ferric oxide hydrate.

7. The method of making active ferric oxide hydrate for the desulphurization of gases which comprises distributing fine iron grains passing a 50-mesh screen in a carrier having high porosity in bulk formation, trickling aerated water containing soluble iron salt through the mass without exhausting the oxygen content of the water until the iron as such has been oxidized, whereby the corrosion takes place in an acid state, and thereafter washing water through the mass whereby residual acid is washed out and residual blue green ferro-ferric oxide hydrate is oxidized to yellow brown ferric oxide hydrate, and mixing lime into the mass to assure non-acidity in the resulting material.

8. In the method of corroding iron to oxide in the presence of an ultimate carrier for said oxide, the steps of mixing iron grains and said carrier, and adding materials which react to precipitate gelatinous ferric hydrate including chemical promotor of oxidation material whereby the said precipitate anchors the iron grains to the carrier and covers the iron, said precipitate including the promotor whereby to initiate corrosion in the presence of an iron oxide.

9. In the method of corroding iron to oxide in the presence of an ultimate carrier for said oxide, the step of mixing iron grains and said carrier together with an insoluble iron oxide hydrate, whereby the hydrate coats the carrier and the iron and anchors the iron to the carrier.

10. In the method of corroding iron to oxide in the presence of an ultimate carrier for said oxide, the step of mixing iron grains and said carrier together with an insoluble iron oxide hydrate and chemical promotor of oxidation, whereby the hydrate coats the carrier and the iron, and anchors the iron to the carrier, and the promotor initiates corrosion in the presence of an iron oxide.

11. In the method of corroding iron to iron oxide in the presence of an ultimate carrier for said oxide, the steps of mixing iron grains and said carrier, and adding water, calcium oxide, and excess of iron sulphate, whereby the resulting precipitate of iron hydroxide and calcium sulphate anchors the iron grains to the carrier, and the excess iron sulphate provides promotor for initiating corrosion in the presence of an iron oxide.

ARTHUR L. SMYLY.